(12) United States Patent
Yoon et al.

(10) Patent No.: US 9,065,640 B2
(45) Date of Patent: Jun. 23, 2015

(54) METHOD AND APPARATUS FOR GENERATING NON-INTERACTIVE KEY AND METHOD FOR COMMUNICATION SECURITY USING THE SAME

(75) Inventors: Hyo Jin Yoon, Yongin-si (KR); Jin Young Kim, Seongnam-si (KR); Won Il Lee, Seongnam-si (KR); Jin Yeop Chang, Seoul (KR); Chung Hyeok Lee, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 450 days.

(21) Appl. No.: 12/939,489

(22) Filed: Nov. 4, 2010

(65) Prior Publication Data

US 2011/0103581 A1    May 5, 2011

(30) Foreign Application Priority Data

Nov. 4, 2009  (KR) .......................... 10-2009-0106010

(51) Int. Cl.
*H04L 9/00* (2006.01)
*H04L 9/08* (2006.01)
*H04W 12/04* (2009.01)

(52) U.S. Cl.
CPC ............. *H04L 9/0861* (2013.01); *H04L 9/0872* (2013.01); *H04L 9/088* (2013.01); *H04L 2209/80* (2013.01); *H04W 12/04* (2013.01)

(58) Field of Classification Search
CPC ..... H04L 9/0861; H04L 9/0872; H04L 9/088; H04L 2209/80

USPC ....................................... 380/44–47, 262, 277
See application file for complete search history.

(56) References Cited

U.S. PATENT DOCUMENTS

| | | | | |
|---|---|---|---|---|
| 5,717,756 A | * | 2/1998 | Coleman ........................ | 713/155 |
| 6,742,116 B1 | * | 5/2004 | Matsui et al. .................. | 713/171 |
| 2005/0036615 A1 | * | 2/2005 | Jakobsson et al. ............ | 380/255 |
| 2007/0297613 A1 | * | 12/2007 | Ghosh ........................... | 380/277 |
| 2008/0240440 A1 | * | 10/2008 | Rose et al. .................... | 380/277 |
| 2008/0253566 A1 | * | 10/2008 | Hidaka ........................ | 380/255 |
| 2009/0129590 A1 | * | 5/2009 | Konuma ......................... | 380/44 |
| 2010/0098249 A1 | * | 4/2010 | Shin et al. ....................... | 380/44 |

(Continued)

FOREIGN PATENT DOCUMENTS

| | | |
|---|---|---|
| JP | 2008-047954 A | 2/2008 |
| JP | 2009130425 A | 6/2009 |
| KR | 10-2007-0086656 A | 8/2007 |
| WO | 2006/070322 A1 | 7/2006 |

OTHER PUBLICATIONS

Communication dated Mar. 29, 2012 issued by the Japanese Patent Office in counterpart Japanese Patent Application No. 2010-247764.

(Continued)

*Primary Examiner* — Linglan Edwards
(74) *Attorney, Agent, or Firm* — Sughrue Mion, PLLC

(57) ABSTRACT

A method and apparatus for generating a non-interactive key, and a method for communication security using the same. A event is detected, and keys are generated based on the detected event. Thus, keys are generated using a small number of calculating operations with a simple interface and thus a user may easily generate the keys, and the performance of an apparatus using the keys is improved. In addition, the keys are generated without wireless interaction between nodes, thereby improving communication security.

15 Claims, 14 Drawing Sheets

(56) References Cited

U.S. PATENT DOCUMENTS

| | | | |
|---|---|---|---|
| 2010/0167656 A1* | 7/2010 | Zhang et al. | 455/66.1 |
| 2010/0199092 A1* | 8/2010 | Andrus et al. | 713/171 |
| 2010/0220856 A1* | 9/2010 | Kruys et al. | 380/44 |
| 2011/0029778 A1* | 2/2011 | Garcia Morchon et al. | 713/171 |

OTHER PUBLICATIONS

"A fast and compact quantum random number generator." Jennewein et al. Review of Scientific Instruments. vol. 71, p. 1675-1680, No. 4. Apr. 2000.

* cited by examiner

METHOD AND APPARATUS FOR GENERATING NON-INTERACTIVE KEY AND METHOD FOR COMMUNICATION SECURITY USING THE SAME

CROSS-REFERENCE TO RELATED PATENT APPLICATION

This application claims the benefit of Korean Patent Application No. 10-2009-0106010, filed on Nov. 4, 2009, in the Korean Intellectual Property Office, the disclosure of which is incorporated herein in its entirety by reference.

BACKGROUND OF THE INVENTION

1. Field of the Invention

One or more aspects of the present invention relate to methods and apparatuses for generating a non-interactive key, and methods for communication security using the same, and more particularly, to methods and apparatuses for generating a non-interactive key, and methods for communication security using the same, in which keys are generated using a small number of calculating operations with a simple interface and thus a user may easily generate the keys, and the performance of an apparatus using the keys is improved. In addition, the keys are generated without wireless interaction between nodes, thereby improving communication security.

2. Description of the Related Art

Wireless network technologies provide convenience to surpass limits of wired network, and have been used in various devices such as sensor network, mobile communication devices, universal serial bus (USB) memories, smart cards, MP3 players, radios, notebook computers, or the like. Wireless network technologies have expanded their fields, and for example, have been used to transfer important data requiring security, such as personal information, and thus security technologies have become important.

In order to use encryption and security technologies over wireless networks, two nodes need to distribute and establish keys for encryption and decryption prior to transferring data. The keys are established by interaction between the two nodes over wireless networks. Since the interaction between the two nodes over wireless networks is likely to be exposed to a person having no right to access the keys, the key establishment may fail, or the keys may be exposed due to intervention of the person having no right.

In addition, since a typical method of generating and establishing a key includes many calculation steps, it is not easy to use security technologies with keys in miniaturized and specialized devices having limited calculation and recoding performances. In addition, the operational performance of a system performed by the typical method may be reduced due to the excessive calculation steps.

SUMMARY OF THE INVENTION

One or more aspects of the present invention provide methods and apparatuses for generating a non-interactive key, and methods for communication security using the same, in which keys are generated using a small number of calculating operations with a simple interface and thus a user may easily generate the keys, and the performance of an apparatus using the keys is improved. In addition, the keys are generated without wireless interaction between nodes, thereby improving communication security.

According to an aspect of the present invention, there is provided a key generating apparatus including an event detector for detecting at least one event, and a key generator for generating keys according to a result of the detecting of the at least one event detected by the event detector, wherein the key matches a key generated by a target device according to a result of the detecting of the at least one event.

According to another aspect of the present invention, there is provided a method of generating a key in a key generating apparatus, the method including a first key generating apparatus and a second key generating apparatus detecting at least one event, respectively; and the first key generating apparatus and the second key generating apparatus generating keys according to the result of the detecting, respectively.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Hereinafter, a method and apparatus for generating a non-interactive key, and a method for communication security using the same will be described with regard to exemplary embodiments of the invention with reference to the attached drawings. However, while describing the embodiments, detailed descriptions about related well-known functions or configurations that may diminish the clarity of the points of the embodiments of the present invention are omitted.

Figure 1:
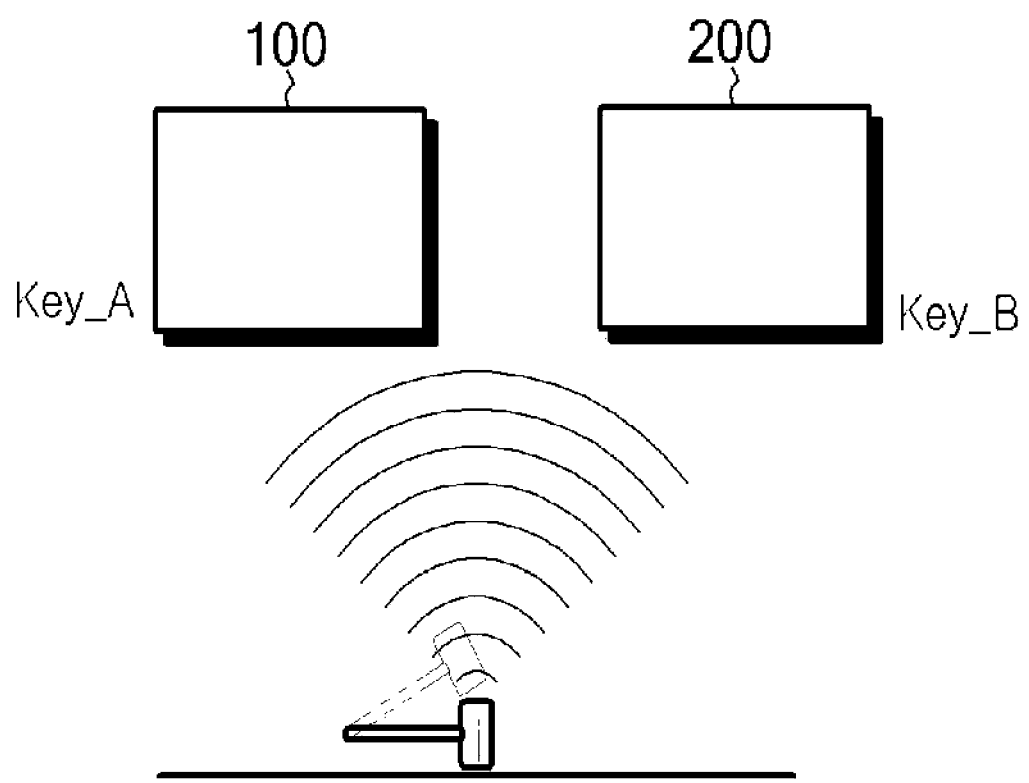
FIG. 1 is a functional block diagram of a key generating system according to an embodiment of the present invention.

FIG. 1 is a functional block diagram of a key generating system according to an embodiment of the present invention.

Referring to FIG. 1, the key generating system according to the present embodiment may include a first key generating apparatus 100, and a second key generating apparatus 200.

When an event occurs, the first key generating apparatus 100 and the second key generating apparatus 200 may detect the event. The first key generating apparatus 100 and the second key generating apparatus 200 may generate respective keys, based on a result of the detecting.

The first key generating apparatus 100 and the second key generating apparatus 200 may be positioned in the same space at least when generating the respective keys. That is, when an event for generating keys occurs, the first key generating apparatus 100 and the second key generating apparatus 200 may be positioned in the same place where both the first key generating apparatus 100 and the second key generating apparatus 200 may detect the event.

According to an embodiment of the present invention, the first key generating apparatus 100 and the second key generating apparatus 200 generate a key 'Key_A', and a key 'Key_B', respectively, so that the key 'Key_A' and the key 'Key_B' may match each other. For example the key 'Key_A' and the key 'Key_B' may be the same, or may have interactive hierarchical structures.

The event may be, for example, shocks, touch, oscillation, sound, and/or light. The first key generating apparatus 100 and the second key generating apparatus 200 may each include at least one sensor for detecting the event.

According to the present embodiment, the event detected by the first key generating apparatus 100 and the second key generating apparatus 200 may occur naturally or artificially. For example, an artificial event may be hammer sound, as illustrated in FIG. 1. A point of time when a natural event occurs may be likely to be unpredictable. If the time and place for the natural event is relatively predictable, the key generating system according to the present embodiment may be used. However, the key generating system may not preclude a case where occurrence of the natural event is unpredictable.

According to an embodiment of the present invention, a source for generating the event may be a separate device (e.g., a hammer, and a light source) or a natural phenomenon, but not the first and second generating apparatuses 100 and 200. Also, the source may be the first key generating apparatus 100 and the second key generating apparatus 200 themselves.

For example, the event may be sound or oscillation generated when the first key generating apparatus 100 and the second key generating apparatus 200 hit each other. For example, when the first key generating apparatus 100 and the second key generating apparatus 200 hit each other twice, the first key generating apparatus 100 and the second key generating apparatus 200 may detect points of time when events occur due to the hitting, and may generate respective keys based on a difference between the points of time when the events occur. The key generating system according to the present embodiment will be described in detail with reference to FIGS. 5 through 7.

According to another embodiment of the present invention, the first key generating apparatus 100 and the second key generating apparatus 200 may generate respective keys based on a point of time when an event occurs, or may generate keys based on the attribute of the event. In this case, when the event is sound, the attribute of the event may be frequency characteristic. When the event is light, the attribute of the event may be an intensity of light.

According to an embodiment of the present invention, the first key generating apparatus 100 and the second key generating apparatus 200 may detect a plurality of events that occur at intervals, and may generate respective keys as a result of the detecting. For example, when two events occur at an interval, the first key generating apparatus 100 and the second key generating apparatus 200 may generate the respective keys based on a difference between points of time when the two events occur.

As another example, a first event may be sound, and a second event may be light. In this case, the first key generating apparatus 100 and the second key generating apparatus 200 may generate respective keys based on points of time when the first and second events occur, and the attributes of the first and second events themselves.

According to an embodiment of the present invention, the first key generating apparatus 100 and the second key generating apparatus 200 may detect an event, and may enter a key generating mode for generating keys. In this case, the first key generating apparatus 100 and the second key generating apparatus 200 may generate the keys in the key generating mode only.

According to an embodiment of the present invention, the first key generating apparatus 100 and the second key generating apparatus 200 may enter a key releasing mode for security keys (SKs) that are respectively registered by of the first key generating apparatus 100 and the second key generating apparatus 200. In the key releasing mode, the first key generating apparatus 100 and the second key generating apparatus 200 may detect events, and may release registration of the SKs based on the detected events. Also in the key releasing mode, the first key generating apparatus 100 and the second key generating apparatus 200 may be positioned in the same physical space, and may detect at least one event.

The first key generating apparatus 100 determines whether the key 'Key_A' generated by the first key generating apparatus 100 matches the key 'Key_B' generated by the second key generating apparatus 200. When the first key generating apparatus 100 determines that the key 'Key_A' matches the key 'Key_B', the first key generating apparatus 100 registers the key 'Key_A' as the SK. In addition, the second key generating apparatus 200 determines whether the key 'Key_B' matches the key 'Key_A'. When the second key generating apparatus 200 determines that the key 'Key_B' matches the key 'Key_A', the second key generating apparatus 200 registers the key 'Key_B' as the SK.

The first key generating apparatus 100 and the second key generating apparatus 200 may each be, for example, a wireless communication device, a mobile device (a cellular phone, a smart phone, a personal digital assistant (PDA), or a notebook computer), or a storage device (a universal serial bus (USB) memory, a smart card, or a MP3 player). The first key generating apparatus 100 and the second key generating apparatus 200 are not necessarily a wireless communication or a mobile device, and may be a fixed device such as a wired communication device, or a desk top personal computer (PC).

According to an embodiment of the present invention, the first key generating apparatus 100 may be a smart phone, and the second key generating apparatus 200 may be a notebook computer. Alternatively, the first key generating apparatus 100 may be a USB memory, and the second key generating apparatus 200 may be a desk top PC. The key generating system according to the present embodiment may be effectively used to issue certificate for banking.

It is assumed that the first key generating apparatus 100 generates the key 'Key_A', and that the second key generating apparatus 200 generates the key 'Key_B'. A process of registering the SKs by the first key generating apparatus 100 and the second key generating apparatus 200 will now be described. In this case, the SKs may be keys used for communication between the first key generating apparatus 100 and the second key generating apparatus 200, and for example, may be used for authentication, or encryption, and/or decryption.

According to an embodiment of the present invention, the first key generating apparatus 100 encrypts data by using the Key_A, and transmits the encrypted data to the second key generating apparatus 200.

The second key generating apparatus 200 tries to decrypt the encrypted data transmitted from the first key generating apparatus 100 by using the key 'Key_B'. When decryption using the key 'Key_B' is successful, the second key generating apparatus 200 registers the key 'Key_B' as the SK to be used to communicate with the first key generating apparatus 100.

The second key generating apparatus 200 may also encrypt data by using the key 'Key_B'. The first key generating apparatus 100 tries to decrypt the encrypted data by using the key 'Key_A'. When decryption is successful, the first key generating apparatus 100 registers the 'Key_A' as the SK to be used to communicate with the second key generating apparatus 200. Then, when the first key generating apparatus 100 transmits data to the second key generating apparatus 200, the first key generating apparatus 100 encrypts the data by using the key 'Key_A', and transmits the data to the second key generating apparatus 200. In addition, when the second key generating apparatus 200 transmits data to the first key generating apparatus 100, the second key generating apparatus 200 encrypts the data by using the key 'Key_B', and transmits the data to the first key generating apparatus 100. Thus, the first key generating apparatus 100 and the data to the second key generating apparatus 200 may securely communicate with each other.

As described above, according to an embodiment of the present invention, the second key generating apparatus 200 may register the SK to be used to communicate with the first key generating apparatus 100 without receiving the key 'Key_A' of the first key generating apparatus 100. On the other hand, the first key generating apparatus 100 may also register the SK to be communicate with the second key generating apparatus 200 without receiving the key 'Key_B' of the second key generating apparatus 200. Likewise, it is not required to transmit a key generated by an apparatus to another apparatus, and thus there is no possibility that the apparatuses are hacked so that the key is exposed.

Alternatively, when the first key generating apparatus 100 and the second key generating apparatus 200 determines the SKs, respective keys generated by the first key generating apparatus 100 and the second key generating apparatus 200 may be exchanged between the first key generating apparatus 100 and the second key generating apparatus 200. For example, the first key generating apparatus 100 transmits the key 'Key_A' to the second key generating apparatus 200, and the second key generating apparatus 200 transmits the key 'Key_B' to the first key generating apparatus 100. Then, the first key generating apparatus 100 compares the key 'Key_B' transmitted from the second key generating apparatus 200 with the key 'Key_A' stored in the first key generating apparatus 100, and determines whether the key 'Key_A' matches the key 'Key_B'. The first key generating apparatus 100 registers the key 'Key_A' as the SK to be used to communicate with the second key generating apparatus 200 only when the key 'Key_A' matches the key 'Key_B'. Meanwhile, the second key generating apparatus 200 compares the key 'Key_A' transmitted from the first key generating apparatus 100 with the key 'Key_B' stored in the second key generating apparatus 200, and determines whether the key 'Key_B' matches the key 'Key_A'. The second key generating apparatus 200 registers the key 'Key_B' as the SK to be used to communicate with the first key generating apparatus 100 only when the key 'Key_B' matches the key 'Key_A'.

The key generating system of FIG. 1 includes two key generating apparatuses, but the present embodiment is not limited thereto. For example, the key generating system may include three or more key generating apparatuses. In addition, in FIG. 1, each of the first and second key generating apparatuses 100 and 200 generates a single key. Alternatively, each of the first and second key generating apparatuses 100 and 200 may generate at least one key.

In FIG. 1, the first key generating apparatus 100 and the second key generating apparatus 200 generate respective keys having the same authorization (that is, the same level), but the present embodiment is not limited thereto. That is, the first key generating apparatus 100 and the second key generating apparatus 200 may generate keys having different authorizations.

Figure 2:
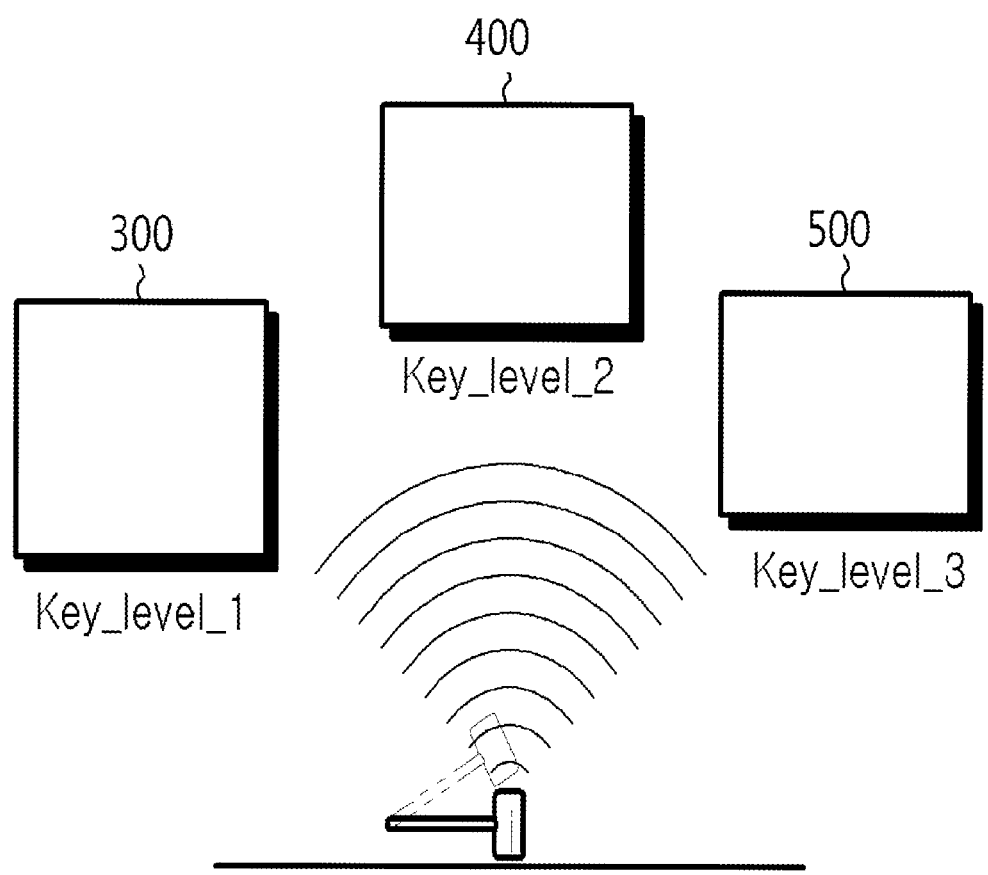
FIG. 2 is a functional block diagram of a key generating system according to another embodiment of the present invention.
Figure 3:
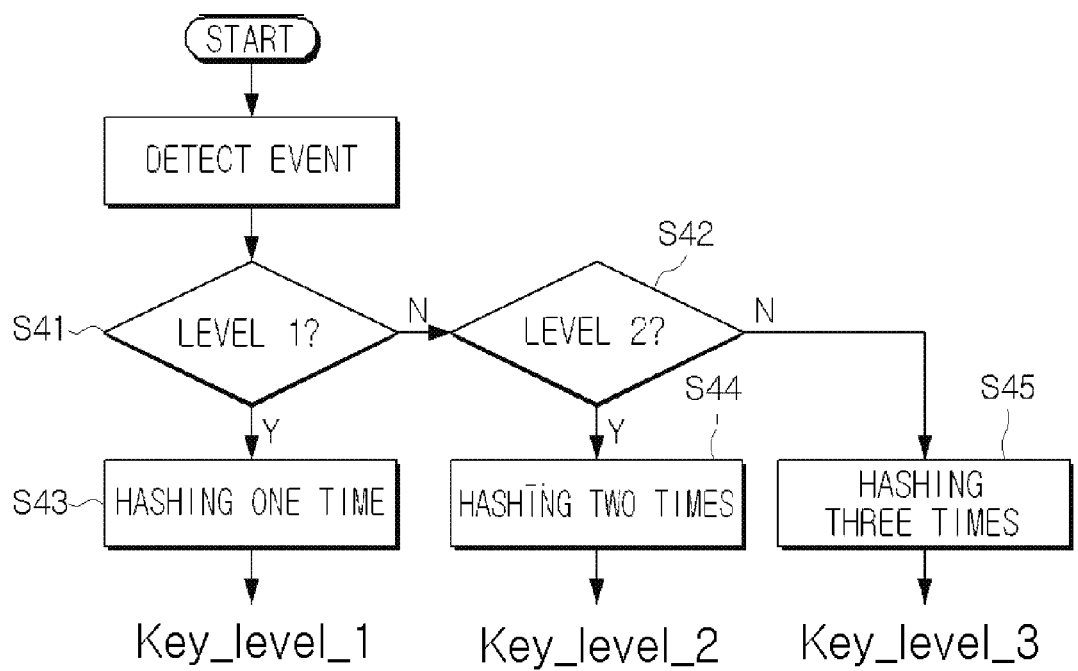
FIGS. 3 and 4 are diagrams for explaining the key generating system of FIG. 2 in detail.
Figure 4:
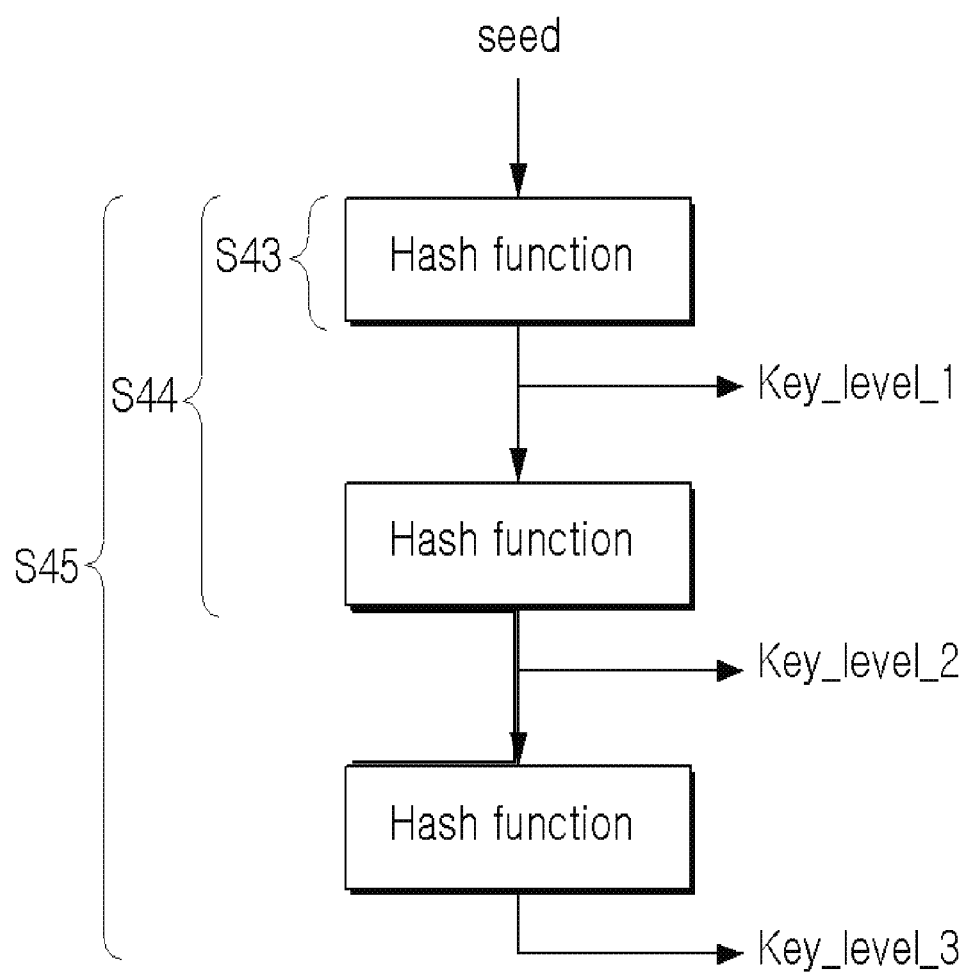

FIG. 2 is a functional block diagram of a key generating system according to another embodiment of the present invention. FIGS. 3 and 4 are diagrams for explaining the key generating system of FIG. 2 in detail.

Referring to FIG. 2, the key generating system according to the present embodiment may include a third key generating apparatus 300, a fourth key generating apparatus 400, and a fifth key generating apparatus 500.

Like in FIG. 1, when an event occurs, the third key generating apparatus 300, the fourth key generating apparatus 400, and the fifth key generating apparatus 500 may detect the event, and may generate respective keys. In addition, the third key generating apparatus 300, the fourth key generating apparatus 400, and the fifth key generating apparatus 500 may be positioned in the same space at least when generating the respective keys.

The key generating system of FIG. 2 is different from the key generating system of FIG. 1 in that the third key generating apparatus 300, the fourth key generating apparatus 400, and the fifth key generating apparatus 500 generate the respective keys having different authorizations. Hereinafter, the key generating system according to the present embodiment will be described in terms of differences from the key generating system of FIG. 1, and the detailed description will not be repeated.

For convenience of description, it is assumed that the third key generating apparatus 300, the fourth key generating apparatus 400, and the fifth key generating apparatus 500 generates a first level key 'Key_level_1', a second level key 'Key_level_2', and a third level key 'Key_level_3', respectively. In addition, it is assumed that the first level key 'Key_level_1' has the highest authorization, and the third level key 'Key_level_3' has the lowest authorization.

Referring to FIGS. 3 and 4, when the third key generating apparatus 300, the fourth key generating apparatus 400, and the fifth key generating apparatus 500 are positioned in the same space, if the event occurs, the third key generating apparatus 300, the fourth key generating apparatus 400, and the fifth key generating apparatus 500 may generate respective keys corresponding to respective levels.

An operation of the third key generating apparatus 300 will now be described. The third key generating apparatus 300 may perform a hashing operation one time so as to generate the first level key 'Key_level_1' (Operation S43). According to the present embodiment, the third key generating apparatus 300 may check its level prior to generating a key (Operation S41). In this case, the level checking operation (Operation S41) may be performed at any time before or after detection of the event In FIG. 3, the level checking operation (Operation S41) is performed. Alternatively, the level checking operation (Operation S41) may be omitted. For example, during manufacture of the third key generating apparatus 300, the third key generating apparatus 300 is configured based on its level. In this case, the third key generating apparatus 300 may be configured in a hardware and/or a software so that, when the third key generating apparatus 300 detects the event, the third key generating apparatus 300 may automatically perform a hashing operation one time. In this case, the level checking operation (Operation S41) is not performed.

The fourth key generating apparatus 400 generates the second level key 'Key_level_2' as follows. The fourth key generating apparatus 400 performs a hashing operation two times based on the event detection result (Operation S44). As illustrated in FIG. 4, the fourth key generating apparatus 400 inputs the event detection result as a seed of a hash function, inputs the resultant as a seed of the hash function again so as to generate the second level key 'Key_level_2'.

The fifth key generating apparatus 500 performs a hashing operation three times based on the event detection result (Operation S45). As illustrated in FIG. 4, the fifth key generating apparatus 500 inputs the event detection result as a seed of the hash function, inputs the resultant as a seed of the hash function again, and then inputs the resultant as a seed of the hash function so as to generate the third level key 'Key_level_3'.

Likewise, the third key generating apparatus 300, the fourth key generating apparatus 400, and the fifth key generating apparatus 500 may generate the respective keys with different levels.

As shown in FIG. 4, the second level key 'Key_level_2' and the third level key 'Key_level_3' may be generated based on the first level key 'Key_level_1', but the first level key 'Key_level_1' and the second level key 'Key_level_2' may not be generated based on the third level key 'Key_level_3'. This is the unique properties of the hash function. For instance, the fifth key generating apparatus 500 with the third level key 'Key_level_3' may not generate the first level key 'Key_level_1' and the second level key 'Key_level_2'. The fourth key generating apparatus 400 may not generate the first level key 'Key_level_1', but may generate the third level key 'Key_level_3'. That is, the first level key 'Key_level_1', the second level key 'Key_level_2', and the third level key 'Key_level_3' have interactive hierarchical structures.

According to an embodiment of the present invention, the third key generating apparatus 300 may previously contain not only the first level key 'Key_level_1', but also the second level key 'Key_level_2' and the third level key 'Key_level_3'. That is, the third key generating apparatus 300 may previously generate and store lower level keys than its level. Also, the fourth key generating apparatus 400 may previously generate and store not only the second level key 'Key_level_2', but also the third level key 'Key_level_3' that is lower than the second level key 'Key_level_2'. Since there is no apparatus with a lower level than the fifth key generating apparatus 500, the fifth key generating apparatus 500 may contain the third level key 'Key_level_3' only.

According to the present embodiment, the third key generating apparatus 300 and the fourth key generating apparatus 400 registers SKs as follows. For example, when the fourth key generating apparatus 400 transmits data to the third key generating apparatus 300, the fourth key generating apparatus 400 may encrypt the data by using the second level key 'Key_level_2', and then may transmit the encrypted data to the third key generating apparatus 300. The third key generating apparatus 300 may sequentially try to decrypt the encrypted data received from the fourth key generating apparatus 400 by using the keys (i.e., the first level key 'Key_level_1', the second level key 'Key_level_2', and the third level key 'Key_level_3') contained in the third key generating apparatus 300. When the decryption is successful, the third key generating apparatus 300 may register the first level key 'Key_level_1' as the SK to be used to communicate with the fourth key generating apparatus 400. Alternatively, since the third key generating apparatus 300 previously contains the second level key 'Key_level_2', the third key generating apparatus 300 may register the second level key 'Key_level_2' as the SK to be used to communicate with the fourth key generating apparatus 400.

The third key generating apparatus 300 transmits data for SK registration to the fourth key generating apparatus 400 as follows. When the third key generating apparatus 300 transmits data to the fourth key generating apparatus 400 with a lower level than the third key generating apparatus 300, the third key generating apparatus 300 may encrypt the data by using the second level key 'Key_level_2', or the third level key 'Key_level_3', and then may transmit the data to the fourth key generating apparatus 400. This is because, If the data is encrypted by using the first level key 'Key_level_1', the fourth key generating apparatus 400 may not decrypt the data. Then, the fourth key generating apparatus 400 may sequentially try to decrypt the data encrypted and transmitted by the third key generating apparatus 300, by using the second level key 'Key_level_2' and the third level key 'Key_level_3', which are contained in the fourth key generating apparatus 400. When the decryption is successful, the fourth key generating apparatus 400 may register the second level key 'Key_level_2' as the SK to be used to communicate with the third key generating apparatus 300.

An operation for registering SKs between the third key generating apparatus 300 and the fifth key generating apparatus 500, and an operation for registering SKs between the fourth key generating apparatus 400 and the fifth key generating apparatus 500 may be performed by using a similar method to the above-described method.

According to another embodiment of the present invention, the third key generating apparatus 300, the fourth key generating apparatus 400, and the fifth key generating apparatus 500 may contain respective keys corresponding to respective authority levels only. That is, the third key generating apparatus 300 may contain the first level key 'Key_level_1' only, the fourth key generating apparatus 400 may contain the second level key 'Key_level_2' only, and the fifth key generating apparatus 500 may contain the third level key 'Key_level_3' only. According to the present embodiment, a lower level key than the current key may be generated and used if necessary. For example, when the third key generating apparatus 300 receives encrypted data from the fourth key generating apparatus 400, the third key generating apparatus 300 may input a first level key contained in the third key generating apparatus 300 to a hash function so as to generate a second level key. The third key generating apparatus 300 may decrypt the data received from the fourth key generating apparatus 400 by using the second level key. In addition, when the third key generating apparatus 300 receives encrypted data from the fifth key generating apparatus 500, the third key generating apparatus 300 may input the first level key contained in the third key generating apparatus 300 to the hash function so as to generate the second level key, and then may input the second level key to the hash function so as to generate a third level key. The third key generating apparatus 300 may decrypt data received from the fifth key generating apparatus 500 by using the generated third level key.

So far, the case three level-keys are used has been described. Alternatively, four or more level-keys may be used. For example, key generating apparatuses may generate respective level keys corresponding to respective authority levels, from among a first level key, a second level key, a third level key, through, an $(n-1)_{th}$ level key, an $n_{th}$ level key (where n is a positive integer). A key generating apparatus inputs the event detection result to a key generating function so as to generate a level key corresponding to its authority level. In this case, when the first level key is generated, the event detection result is input to the key generating function. When the second level key is generated, the first level key is input to the key generating function. When the third level key is generated, the second level key is input to the key generating function. In addition, when the $n_{th}$ level key is generate, the $(n-1)_{th}$ level key is input to the key generating function. If the key generating apparatus has an n-level authority, the key generating apparatus may generate and store i) the $n_{th}$ level key, or ii) the first level key through the $n_{th}$ level key.

Figure 5:
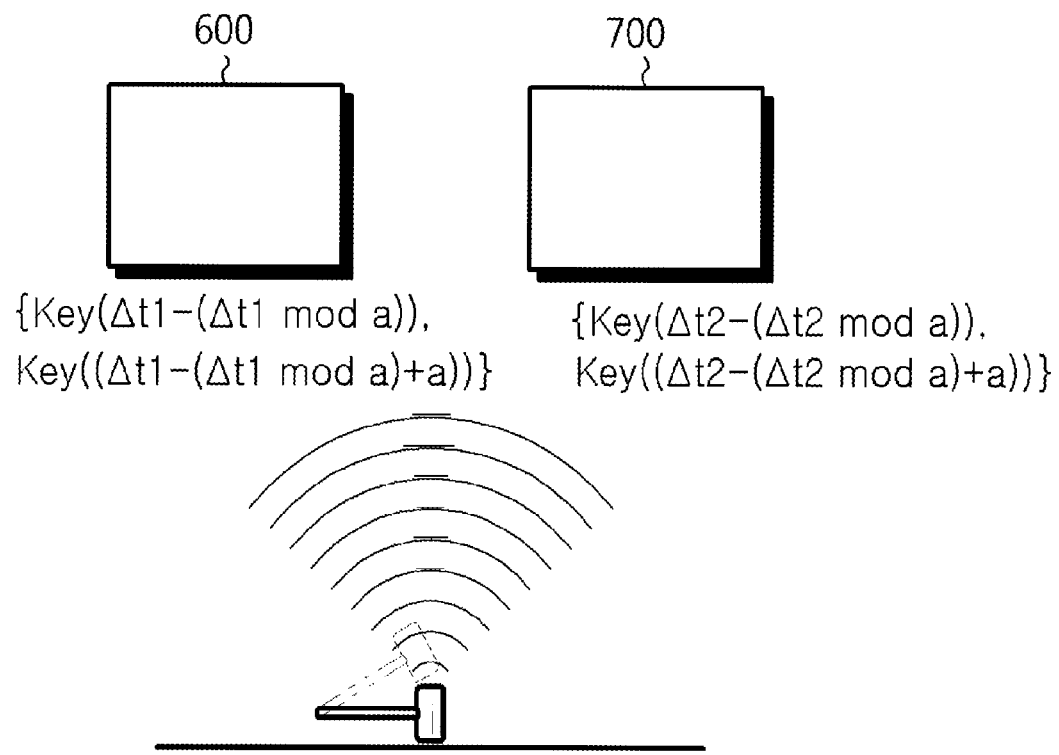
FIG. 5 is a functional block diagram of a key generating system according to another embodiment of the present invention.
Figure 6:
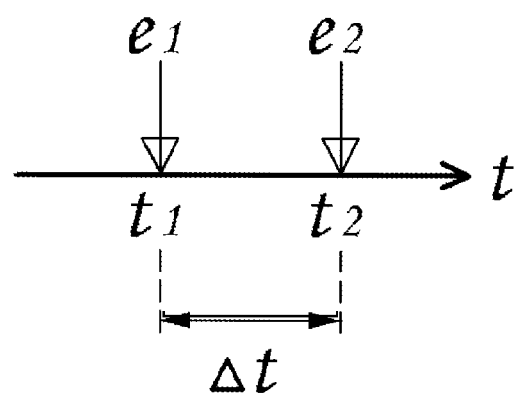
FIGS. 6 through 8 are diagrams for explaining the key generating system of FIG. 5 in detail.
Figure 7:
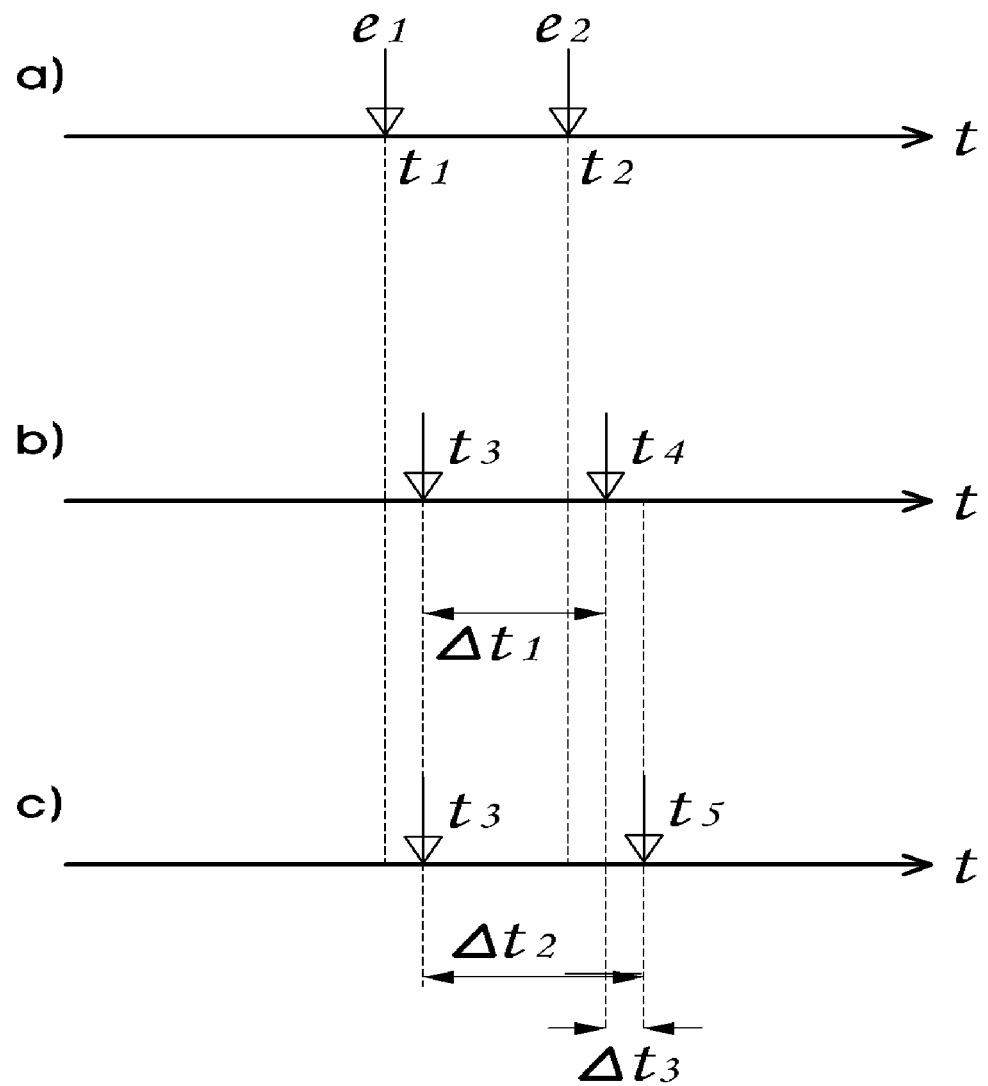
Figure 8:
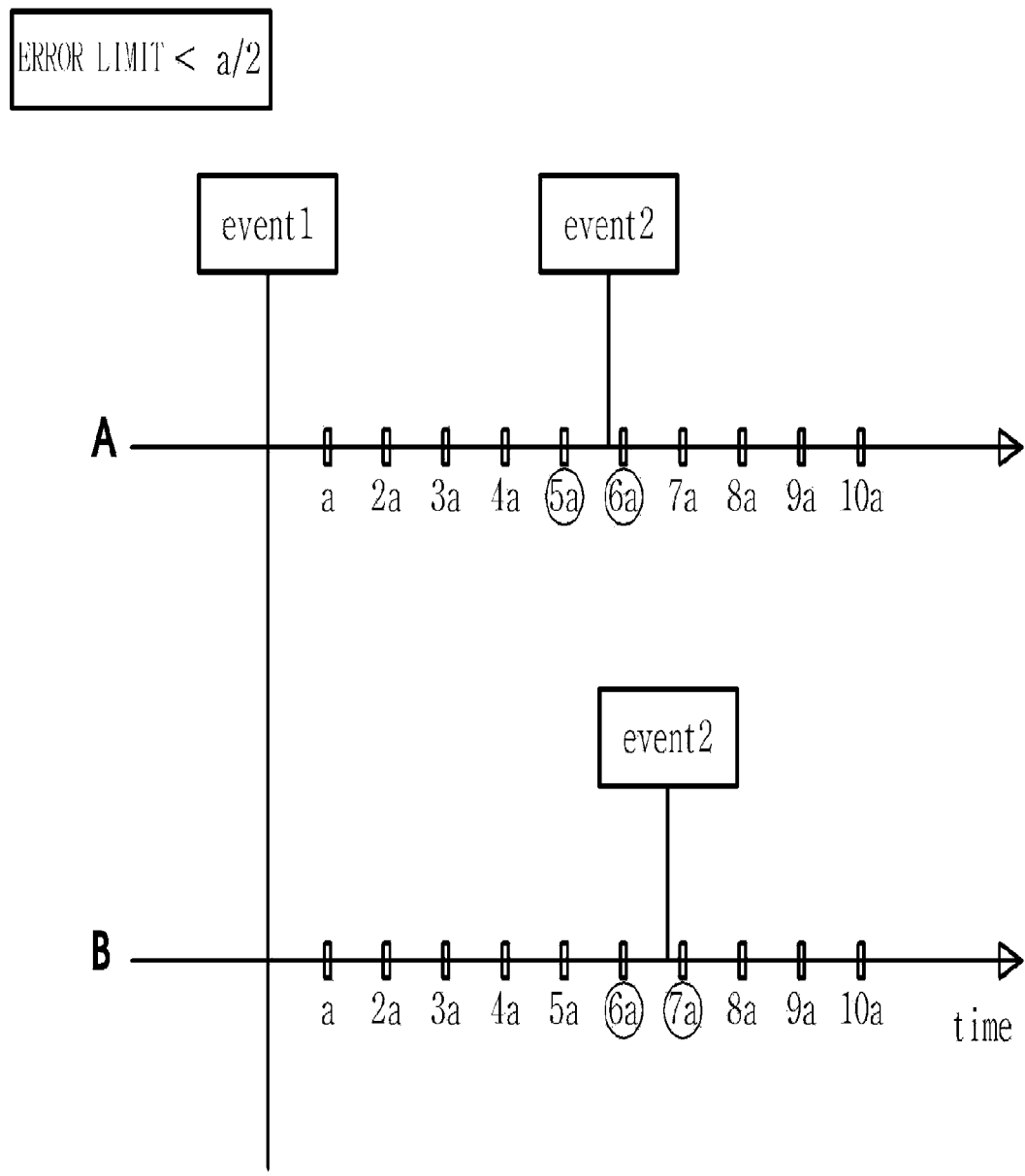

FIG. 5 is a functional block diagram of a key generating system according to another embodiment of the present invention. FIGS. 6 through 8 are diagrams for explaining the key generating system of FIG. 5 in detail.

Referring to FIG. 5, the key generating system according to the present embodiment may include a sixth key generating apparatus 600, and a seventh key generating apparatus 700.

According to the present embodiment, when an event occurs, the sixth key generating apparatus 600 may generate a first key set, and the seventh key generating apparatus 700 may generate a second key set. The sixth key generating apparatus 600 and the seventh key generating apparatus 700 may be in the same space at least when generating the respective keys. That is, when an event for generating keys occurs, the sixth key generating apparatus 600 and the seventh key generating apparatus 700 may be positioned in the same place where both the sixth key generating apparatus 600 and the seventh key generating apparatus 700 may detect the event.

According to an embodiment of the present invention, the sixth key generating apparatus 600 and the seventh key generating apparatus 700 may detect events that occur at intervals. Hereinafter, the key generating system according to the present embodiment will be described in terms of differences from the key generating system of FIG. 1, and the detailed description will not be repeated.

For convenience of description, it is assumed that a first event e1, and a second even e2 occur at a time $t_1$ and a time $t_2$, respectively (refer to FIG. 7). In addition, it is assumed that the sixth key generating apparatus 600 detects the first event e1 at a time $t_3$ and detects the second even e2 at a time $t_4$, and the seventh key generating apparatus 700 detects the first event e1 at the time $t_3$ and detects the second even e2 at a time $t_5$.

According to an embodiment of the present invention, the first key set and the second key set may be given by Equation 1 below.

First key set={Key($\Delta t1$−($\Delta t1$ mod $a$)),Key(($\Delta t1$−($\Delta t1$ mod $a$)+$a$))}

Second key set={Key($\Delta t2$−($\Delta t2$ mod $a$)),Key(($\Delta t2$−($\Delta t2$ mod $a$)+$a$))}   Equation 1

In Equation 1, 'Key($\Delta t1$−($\Delta t1$ mod $a$))' is obtained by inputting '$\Delta t1$−($\Delta t1$ mod $a$)' to a hash function, 'Key($\Delta t1$−($\Delta t1$ mod $a$)+$a$)' is obtained by inputting '$\Delta t1$−($\Delta t1$ mod $a$)+$a$' to the hash function, 'Key($\Delta t2$−($\Delta t2$ mod $a$))' is obtained by inputting '$\Delta t2$−($\Delta t2$ mod $a$)' to the hash function, and 'Key($\Delta t2$−($\Delta t2$ mod $a$)+$a$)' is obtained by inputting '$\Delta t2$−($\Delta t2$ mod $a$)+$a$' to the hash function.

In Equation 1, $\Delta t_1$ is a time interval between the time $t_3$ when the sixth key generating apparatus 600 detects the first event e1 and the time $t_4$ when the sixth key generating apparatus 600 detects the second even e2, and $\Delta t_2$ is a time interval between the time $t_3$ when the seventh key generating apparatus 700 detects the first event e1 and the time $t_5$ when the seventh key generating apparatus 700 detects the second even e2. In addition, 'mod' is an operator for calculating a remainder, and for example, 13 mod 3 is 1.

In addition, in Equation 1, a value 'a' is a constant determined based on a detection error between the sixth key generating apparatus 600 and the seventh key generating apparatus 700. A point of time when the sixth key generating apparatus 600 detects an event, and a point of time when the seventh key generating apparatus 700 detects the event may be different from each other. A detection error may be set according to product types, or may be generated even in products of the same product type since the products are different from a hardware or software point of view.

According to an embodiment of the present invention, a value input to a hash function may be set as an integer number of times the value 'a'. In addition, the value 'a' may be set as two times a detection error limit or more. For example, when the detection error does not exceed 0.1 seconds, the value 'a' may be set as 0.2 seconds or more.

With reference to FIG. 8, the case where the value 'a' is set as two times the detection error limit or more will now be described in detail. Referring to FIG. 8, the value input to the hash function may be an integer number of times the value 'a', that is, a, 2a, 3a, 4a, through na (where 'n' is a positive integer) may be input. In this case, an 'A' axis indicates points of time at which the sixth key generating apparatus 600 detects an event 1 and an event 2, and a 'B' axis indicates points of time at which the seventh key generating apparatus 700 detects the event 1 and the event 2.

Referring to FIG. 8, the event 2 is positioned between '5a' and '6a' on the 'A' axis. In this case, according to an embodiment of the present invention, the values '5a' and '6a' are selected as values to be input to a hash function. That is, values, which are obtained by rounding up and down a point of time when the event 2 occurs, are input to the hash function, and the output resultant values may constitute the first key set.

The event 2 is positioned between the '6a' and '7a' on the 'B' axis. In this case, according to the present embodiment, the values '6a' and '7a' may be values to be input to the hash function. That is, values obtained by rounding down and up a time when the event 2 occurs may be values '6a' and '7a', respectively, on the 'B' axis. The values '6a' and '7a' are values to be input to the hash function. Similarly, values output by inputting the value '6a' and the value '7a' to the hash function may constitute the second key set.

When the first and second key sets are configured as described above, the first key set and the second key set may have at least one the same key.

For convenience of understanding, according to an embodiment of the present invention, in the presence of various values, the first key set and the second key set are given according to the following table.

| Detection error limit [sec] | a [sec] | $\Delta t_1$ [sec] | $\Delta t_2$ [sec] | First key set | Second key set |
|---|---|---|---|---|---|
| 0.5 | 1 | 3.8 | 4.2 | {Key(3), Key(4)} | {Key(4), Key(5)} |
| 0.5 | 1 | 3.2 | 2.9 | {Key(3), Key(4)} | {Key(2), Key(3)} |

-continued

| Detection error limit [sec] | a [sec] | $\Delta t_1$ [sec] | $\Delta t_2$ [sec] | First key set | Second key set |
|---|---|---|---|---|---|
| 0.5 | 1 | 3.2 | 3.6 | {Key(3), Key(4)} | {Key(3), Key(4)} |
| 1 | 2 | 3.5 | 4.4 | {Key(2), Key(4)} | {Key(4), Key(6)} |
| 1 | 2 | 3.2 | 2.9 | {Key(2), Key(4)} | {Key(2), Key(4)} |
| 0.25 | 0.5 | 3.57 | 3.37 | {Key(3.5), Key(4)} | {Key(3), Key(3.5)} |

With reference to the above table, the first case (a detection error limit: 0.5 seconds, a: 1 second, $\Delta t_1$: 3.8 seconds, and $\Delta t_2$: 4.2 seconds) will now be described.

According to an embodiment of the present invention, the first key set may be determined by {Key($\Delta t1-(\Delta t1 \bmod a)$), Key(($\Delta t1-(\Delta t1 \bmod a)+a$))}. In this case, '($\Delta t1 \bmod a$)' is 0.8, and '$\Delta t1-(\Delta t1 \bmod a)$' is 3. Thus, a first key of the first key set is Key(3). In this case, Key(3) is a value output by inputting '3' to a hash function. A second key of the first key set is '$\Delta t1-(\Delta t1 \bmod a)+a$', that is, Key(4). Likewise, when the second key set is calculated according to Equation 1, the second key set is {Key(4), Key(5)}. The other cases may be obtained in the same method as the described-above method.

As shown in the above table, according to an embodiment of the present invention, the first key set and the second key set may have at least one the same key. The sixth key generating apparatus 600 and the seventh key generating apparatus 700 may register respective SKs by using various methods, which will be sequentially described.

As a first method, the sixth key generating apparatus 600 encrypts data by using any one of the first key set, and transmits the encrypted data to the seventh key generating apparatus 700. The seventh key generating apparatus 700 tries to decrypt the encrypt data received from the sixth key generating apparatus 600, by using keys of the second key set contained in the seventh key generating apparatus 700. If the decryption is successful, the seventh key generating apparatus 700 registers the key used to decrypt the data as a SK. If the seventh key generating apparatus 700 may not decrypt the data by using any key of the second key set contained in the seventh key generating apparatus 700, the seventh key generating apparatus 700 transmits notification that it is not able to decrypt the data, to the sixth key generating apparatus 600. When the sixth key generating apparatus 600 receives the notification from the seventh key generating apparatus 700, the sixth key generating apparatus 600 encrypt data by using another key of the first key set, and transmit the encrypted data to the seventh key generating apparatus 700 again. The seventh key generating apparatus 700 that receives the encrypted data may try to decrypt the encrypted data by using keys of the second key set contained in the seventh key generating apparatus 700 again. If the decryption is successful, the seventh key generating apparatus 700 registers the key used to decrypt the data as a SK. The sixth key generating apparatus 600 may also register a SK by using the same method as in the seventh key generating apparatus 700.

As a second method, the method of registering SKs may include selecting a key used to encrypt the data for registering by the sixth key generating apparatus 600 according to a predetermined standard. That is, in the first method, when the sixth key generating apparatus 600 uses any one among the first key set when encrypting the data. However, in the second method, the sixth key generating apparatus 600 may select the key used to encrypt the data according to a predetermined standard. That is, referring to FIG. 8, since the sixth key generating apparatus 600 recognizes that the event 2 occurs at a point of time closer to the value '6a' than the value '5a' on the 'A' axis, the sixth key generating apparatus 600 selects a key generated by inputting the value '6a' as the key used to encrypt the data for registering. The seventh key generating apparatus 700 that receives the data encrypted by using the selected key may decrypt the data by using any one of two keys of the second key set. In addition, the seventh key generating apparatus 700 registers a key used as a SK when the decryption is successful, and transmits notification that the SK is registered to the sixth key generating apparatus 600. When the sixth key generating apparatus 600 receives the notification, the sixth key generating apparatus 600 may register the key used to encrypt the data as a SK.

According to another embodiment of the present invention, a key generating system may be embodied by combining the key generating systems of FIGS. 2 and 5. That is, the first key set of FIG. 5 may include first level keys, and the second key set may include second level keys. In this case, the first level keys and the second level keys may have interactive hierarchical structures.

Figure 9:
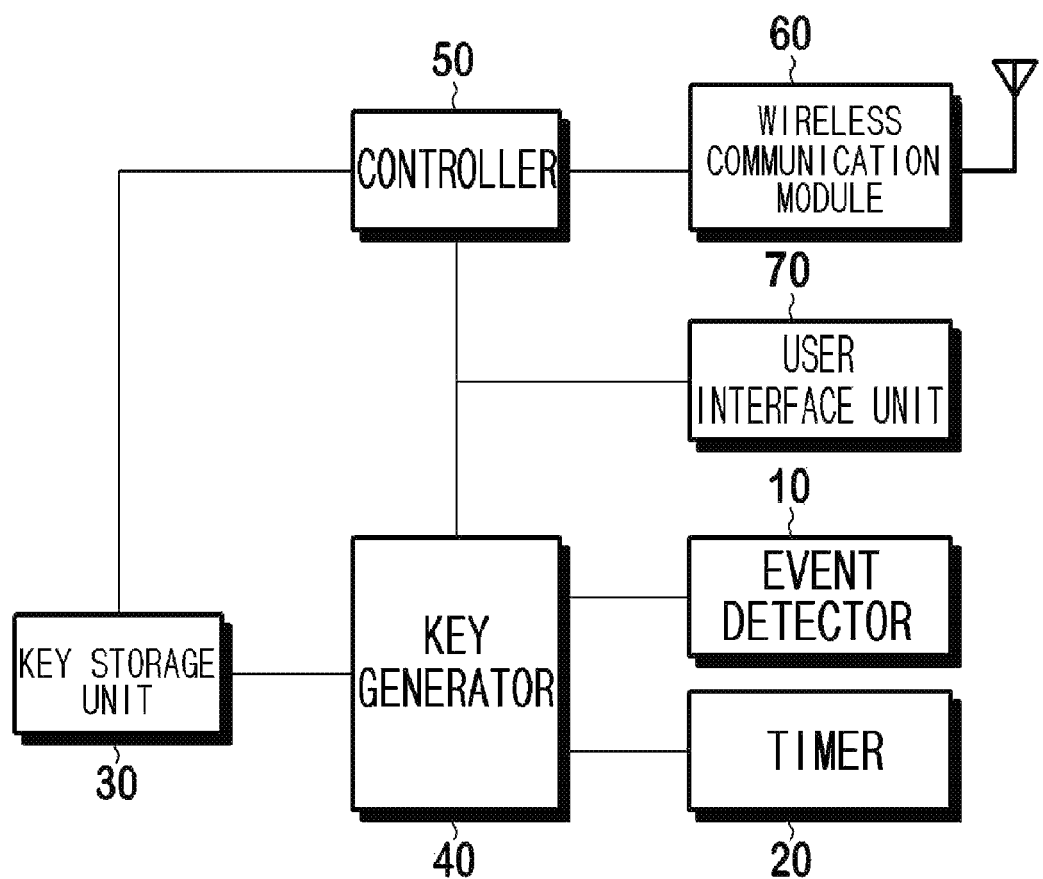
FIG. 9 is a functional block diagram of a non-interactive key generating apparatus according to an embodiment of the present invention.

FIG. 9 is a functional block diagram of a non-interactive key generating apparatus according to an embodiment of the present invention.

Referring to FIG. 9, the non-interactive key generating apparatus according to the present embodiment may include an event detector 10 for detecting an event, a timer 20 for providing a point of time when an event occurs, or a time interval between points of time when events occur, a key generator 40 for generating keys according to the time interval, a key storage unit 30 for storing the keys generated by the key generator 40, a wireless communication module 60 for wireless communication, a controller 50, and a user interface unit 70 for interfacing with a user in order to receive the user's command.

The event detector 10 may detect physical events such as shocks, touch, oscillation, sound, and/or light. The event detector 10 may include at least one sensor from among various kinds of sensors such as a shock detection sensor, a light detection sensor, an audio detection sensor, and a touch detection sensor, according to the attributes of an event to be detected.

According to an embodiment of the present invention, the event detector 10 may detect only an event whose intensity is a reference value or more as a valid event, from among the detected events. The event detection result is transmitted to the key generator 40. For example, when a shock is detected as an event, only the shock with a predetermined intensity or more may be detected as the valid event. When light is detected as an event, only the light with a predetermined intensity or more may be detected as the valid event. Thus, the event detector 10 may distinguish and detect events such as shocks, touch, oscillation, sound, and/or light, which may occur ordinarily, and events that are intentionally input in order to generate keys.

According to another embodiment of the present invention, the event detector 10 may simply detect an event, and the key generator 40 may determine a valid event.

According to the present embodiment, an event may be intentionally generated by a user in order to generate a key, and may be generated at intervals.

The timer 20 may provide points of time at which events occur, or a time interval between the events. For example, the timer 20 may be configured in various methods as follows.

As a first method, when the event detector 10 detects a first event, a second event, a third event, through an $n^{th}$ event (where n is a positive integer), the timer 20 measures time intervals from a point of time when the first event occurs to points of time when next events occurs. The key generator 40 generates keys based on the values measured by the timer 20. For example, when the first event occurs, the timer 20 is reset as a value "0". Whenever next events occur, the time 20 may provide points of time when the next events occur, to the key generator 40.

As a second method, whenever the event detector 10 detects an event, the timer 20 may provide a point of time when the event detector 10 detects the event. In this case, whenever the event detector 10 detects the event, the event detector 10 transmits notification that the event is detected, to the timer 20, and the timer 20 provides a point of time when the timer 20 receives the notification, to the key generator 40.

As a third method, the timer 20 may function as a watch. The timer 20 may continuously provide the time to the key generator 40, and thus the key generator 40 may recognize the time at any time. Whenever the event detector 10 detects an event, the event detector 10 provides notification that the event is detected to the key generator 40. Thus, since the key generator 40 may recognize a point of time at which the key generator 40 receives the notification from the event detector 10, the key generator 40 may calculate a time interval between points of time when events occur. In this case, the timer 20 continuously provides the time to the key generator 40. Alternatively, the timer 20 may provide the time in the key generating mode and the key releasing mode only.

The key generator 40 may generate keys by using a time interval between points of time when events occur. For example, the key generator 40 may generate the keys by inputting the time interval to a hash function, a hash tree, or an interactive key generating algorithm.

According to an embodiment of the present invention, the key generator 40 may generate keys having hierarchical structures, as illustrated in FIG. 2. In addition, the key generator 40 may generate the first key set or the second key set, as illustrated in FIG. 5.

According to an embodiment of the present invention, when the key generator 40 generates keys, the key generator 40 may use a key generating function that is secure from a cryptology point of view, such as a hash function, a hash tree, or an interactive key generating algorithm. A value (i.e., a seed) input to the hash function, the hash tree, or the interactive key generating algorithm may be, for example, the time interval between points of time when events occur. When the hash tree is used, the key generator 40 may generate keys having hierarchical structures.

The key storage unit 30 may store the keys or the key set, generated by the key generator 40.

The user interface unit 70 may interface with the user in order to receive the user's command. The user interface unit 70 may be embodied by, for example, a touch pad, a manipulation button, or the like, and may receive a command for activating a key generating function (hereinafter, referred to as the 'key generating-on command') or a command for inactivating the key generating function (hereinafter, referred to as the 'key generating-off command'), from the user. Throughout this specification, the key generating-on command and the key generating-off command will be collectively referred to as the 'key generating-on/off command'.

When the user inputs the key generating-off command after generation of keys, the key generator 40 may not generate any key. Then, if the user wants to change the key, when the user inputs the key generating-on command, the key generator 40 continues to generate keys.

According to an embodiment of the present invention, the controller 50 may control overall operations of the event detector 10, the timer 20, the key generator 40, the key storage unit 30, the wireless communication module 60, and the user interface unit 70.

For example, the controller 50 may encrypt and store data by using keys stored in the key storage unit 30 when transmitting the data to an external device that is a communication target device. The external device receiving the encrypted data tries to decrypt the data by using a key contained in the external device. The external device may register the key as a SK only when the decryption is successful. On the other hand, when the controller 50 receives predetermined encrypted data from the external device, the controller 50 tries to decrypt by using a key generated by the key generator 40. The controller 50 may register the key as a SK to be used to communicate with the external device only when the decryption is successful. Likewise, according to an embodiment of the present invention, the controller 50 may securely communicate with the external device without transmitting the key generated by the key generator 40 to the external device.

According to another embodiment of the present invention, the controller 50 may transmit and receive a key or a key set to and from a communication target device through the wireless communication module 60. The controller 50 compares the received key with a key or key set stored in the key storage unit 30, and determines whether the keys match each other. When the keys match each other, the controller 50 may authenticate the communication target device, and may perform a control function. For example, the controller 50 may time-synchronized with the communication target device, may perform interactive authentication with respect to the communication target device, and may establish the matched key as a SK for encryption communication. When the key matched between the controller 50 and the communication target device is used as the SK, the controller 50 may perform encryption/decryption functions by using keys that are established when radio-communicating with the communication target device. On the other hand, when there is no matched key, a key generating operation is repeated.

In addition, when the controller 50 receives the key generating-on command, the controller 50 may control the event detector 10 to detect an event, may control the timer 20 to provide a point of time when events occur, or a time interval between the points of time to the key generator 40, and may control the key generator 40 to generate a key. When the controller 50 receives the key generating-off command, the controller 50 may control the key generator 40 not to generate the key. When the key generator 40 is commanded not to perform the key generating operation by the controller 50, the key generator 40 may not perform the key generating operation. Then, until the key generator 40 is commanded to perform the key generating operation by the controller 50, the key generator 40 may not perform the key generating operation.

When the above-described operation of establishing the SK is successful, or fails, the controller 50 deletes values except for intervals between points of time when events occur, and established keys from a memory (not shown). In this case, the memory may be used to store values required to load and execute a program, or the resultant values, in order to operate the controller 50, and may be embodied as a constituent of the controller 50, or as a separate functional block.

By the above-described configuration, the key generating apparatus according to the present embodiment may generate a key based on an event input from a user by using a small number of calculating operations. The user inputs the same event to a plurality of devices performing radio-communication so that the devices may generate the same key or hierarchical keys by using such key generating function. The keys generated by the devices may be used to perform authentication between the key generating apparatus and the communication target device, or to acquire time-synchronization between the key generating apparatus and the communication target device, and may be used for SKs for encryption communication. Likewise, since the keys are registered without interaction between wireless communication devices, the keys may be basically prevented from being exposed to a person having no right to access the keys.

In addition, data such as key pool for generating a key is not required, and keys are generated by using a small number of calculating operations, thereby saving system resources, and ensuring operational performance. Thus, a non-interactive key generating apparatus according to an embodiment of the present invention may be easily applied to an apparatus with a limited system and memory, such as a USB memory, a smart card, and a MP3 player, as well as to a cellular phone, a notebook computer, and a notebook.

According to the above-described embodiments of the present invention, the key generator 40, the controller 50, and the key storage unit 30 are illustrated as respective different blocks, which is for describing the respective functions only. Thus, the key generator 40, the controller 50, and the key storage unit 30 may be divided in more detail, or may be combined.

As described above, the user interface unit 70 is connected to a communication line for connecting the controller 50 and the key generator 40 to each other. Alternatively, the user interface unit 70 may be connected directly to the controller 50. The key generating-on command or the key generating-off command, received from the user interface unit 70, may be transmitted directly to the key generator 40 without passing through the controller 50, which corresponds to a case where the key generator 40 performs operations based on the key generating-on command or the key generating-off command, input from a user, without intervention of the controller 50.

Figure 10:
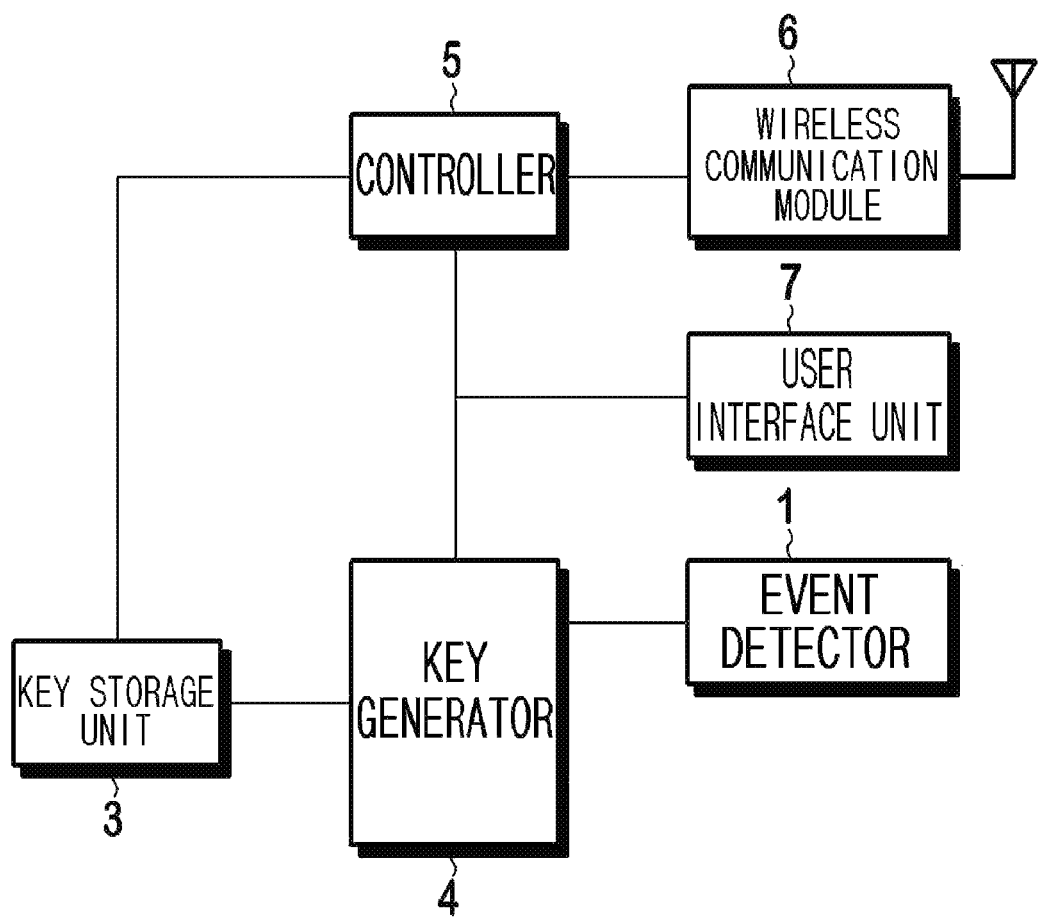
FIG. 10 is a functional block diagram of a non-interactive key generating apparatus according to another embodiment of the present invention.

FIG. 10 is a functional block diagram of a non-interactive key generating apparatus according to another embodiment of the present invention.

Referring to FIG. 10, the non-interactive key generating apparatus according to the present embodiment may include an event detector 1 for detecting an event, a key generator 4 for generating keys according to an event detection result of the event detector 1, a controller 5, a key storage unit 3 for storing the keys generated by the key generator 4, a communication module 6, and a user interface unit 7.

The event detector 1 may detect the event, and the key generator 4 may generate the keys based on the event detection result of the event detector 1. For example, the key generator 4 may generate the keys by using a hash function, a hash tree, or an interactive key generating algorithm.

The event detector 1 may provide the event detection result to the key generator 4, and the key generator 4 may generate the keys based on the event detection result. In this case, the event detection result may be the attribute of the event itself. For example, when the event is sound, the attribute of the event may be frequency characteristic. In addition, the event detection result may be obtained by detecting two or more events. For example, when a primary event may be sound, and a secondary event may be light, the event detection result may be frequency characteristics.

According to an embodiment of the present invention, the key generator 4 may generate respective level keys corresponding to respective authority levels, from among a first level key, a second level key, a third level key, through, an $(n-1)_{th}$ level key, an $n_{th}$ level key (where n is a positive integer). The key generator 4 inputs the event detection result to a key generating function so as to generate a level key corresponding to its authority level. In this case, when the first level key is generated, the event detection result is input to the key generating function. When the second level key is generated, the first level key is input to the key generating function. When the third level key is generated, the second level key is input to the key generating function. When the $n_{th}$ level key is generated, the $(n-1)_{th}$ level key is input to the key generating function. In addition, when the $n_{th}$ level key is generate, the $(n-1)_{th}$ level key is input to the key generating function. If a key generating apparatus has an $n_{th}$-level authority, the key generating apparatus may generate and store i) the $n_{th}$ level key, or ii) the first level key through the $n_{th}$ level key.

The communication module 6 support wireless and/or wired communication.

Operations of the remaining constituents of FIG. 10 (the event detector 1, the controller 5, the key storage unit 3 and the user interface unit 7) are similar to those in FIG. 9 with like numerals, and thus their description will be omitted.

Figure 11:
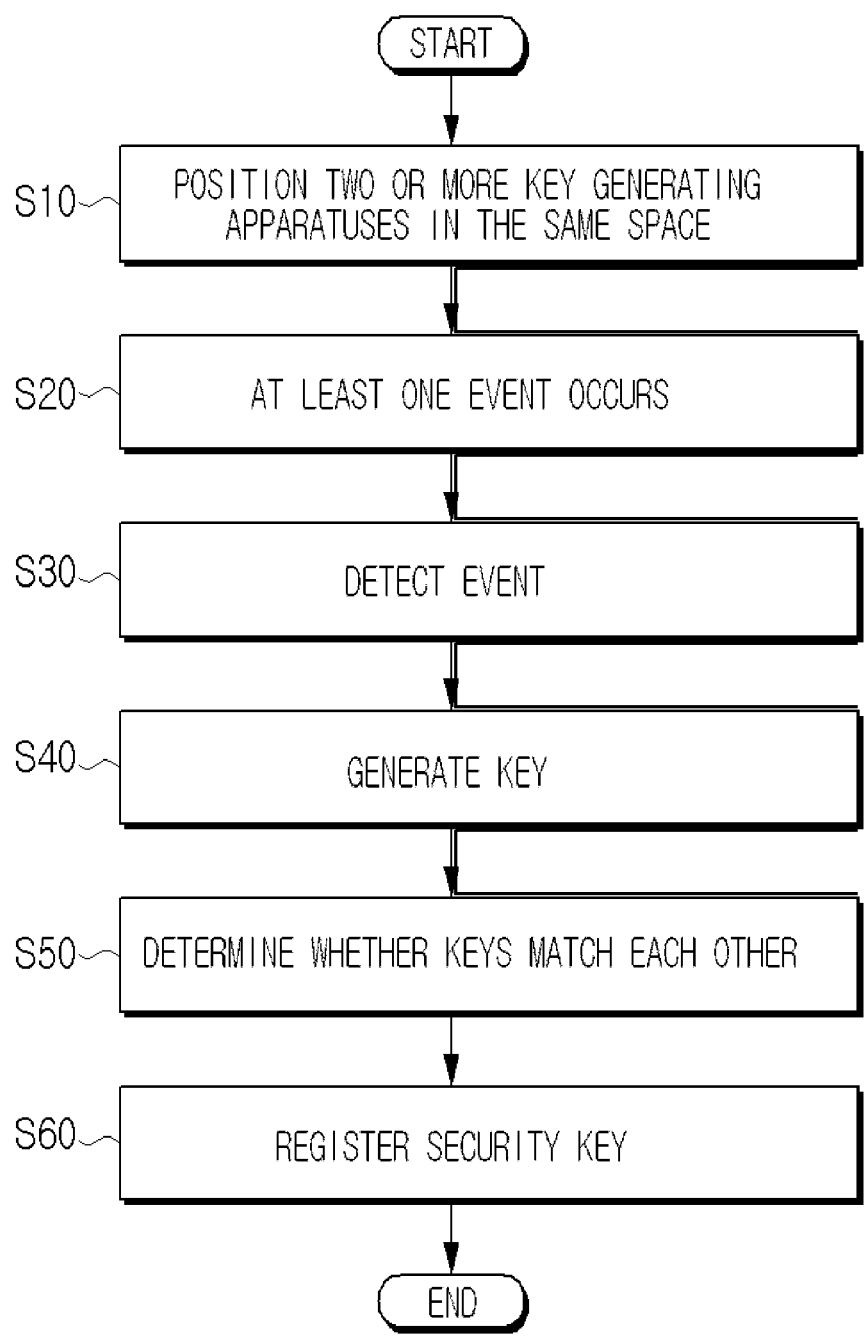
FIG. 11 is a flowchart of a method of generating a non-interactive key, according to an embodiment of the present invention.

FIG. 11 is a flowchart of a method of generating a non-interactive key, according to an embodiment of the present invention.

Referring to FIG. 11, two or more key generating apparatuses are positioned in the same space (Operation S10). At least one physical event occurs (Operation S20). The two or more key generating apparatuses detect the event (Operation S30). The key generating apparatuses detecting the event generate respective keys based on event detection results (Operation S40). Then, the key generating apparatuses determine whether the generated keys match each other (Operation S50). When it is determined that the generated keys match each other, the generated keys are registered as SKs (Operation S60).

In Operation S10, the key generating apparatuses may be any one of the above-descried key generating apparatuses 100, 200, 300, 400, 500, 600, and 700.

In Operation S20, the event detection result may be the attribute of the event itself, points of time at which events occur, or a time interval between the points of time.

In Operation S20, the event may occur naturally or artificially.

In Operation S50, the keys may be keys generated by the key generating apparatuses 100, 200, 300, 400, 500, 600, and 700. For example, in Operation S50, the keys may be the same like in FIG. 1, may have interactive hierarchical structures like in FIG. 2, or may be configured as a key set including a plurality of keys, like in FIG. 5.

In Operation S50, whether the keys match each other may be determined by determining whether the keys (or, key sets) are the same, or whether the keys have interactive hierarchical structures. Operation S50 may be performed without exchanging the keys between the key generating apparatuses, or alternatively, may be performed by exchanging the keys between the key generating apparatuses.

Figure 12:
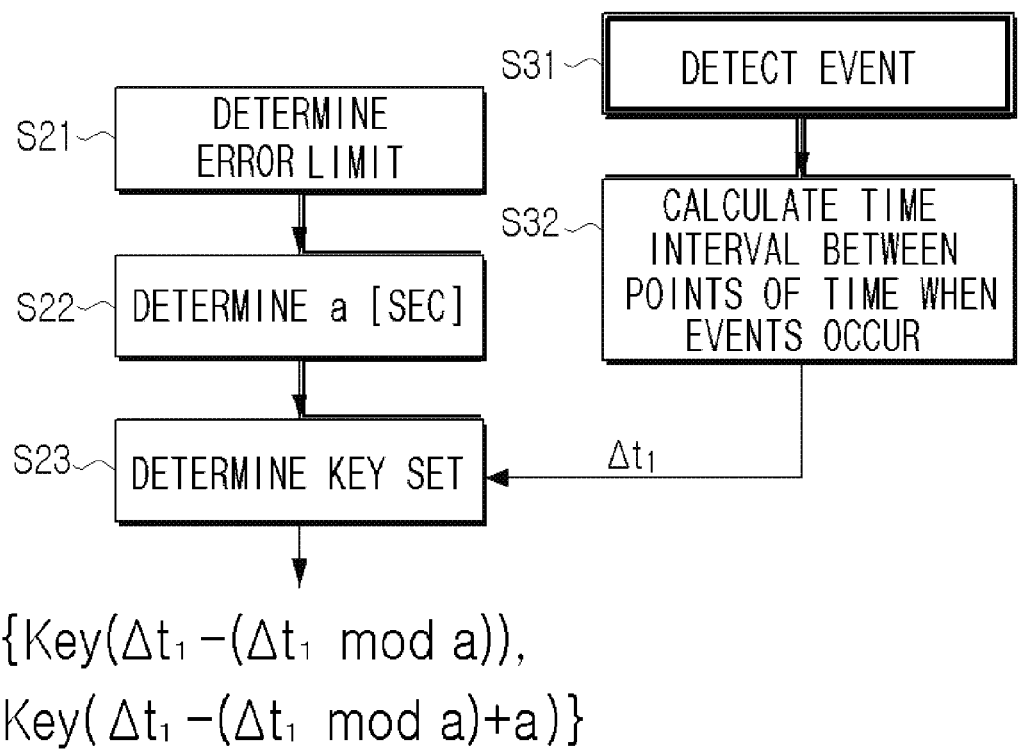
FIG. 12 is a flowchart for explaining the key generating system of FIG. 5 in detail.

FIG. 12 is a flowchart for explaining the key generating system of FIG. 5 in detail.

Referring to FIG. 12, the detection error limit is determined (Operation S21). The value 'a' in Equation 1 is determined based on the detection error limit (Operation S22). Meanwhile, events are detected (Operation S31). A time interval between points of time when the events occur is calculated based on the event detection result (Operation S32).

Key sets may be generated based on the value 'a' determined in Operation S22, and the time interval between the points of time, according to Equation 1 (Operation S23).

In this case, Operations S21, S22 and S23 may be performed prior to Operations S31 and S32, may be simultaneously performed with Operations S31 and S32, or alternatively, may be after Operations S31 and S32.

A method shown in FIG. 12 may be embodied by the key generating system of FIG. 5 and the non-interactive key generating apparatus of FIG. 9. In this case, Operations S21 and S22 may be performed by a user, a software and/or a hardware for calculating the detection error, Operation S31 may be performed by the event detector 10, and Operation S32 may be performed by the timer 20, the controller 50, or the key generator 40.

Operation S23 may be performed by the key generator 40.

Figure 13:
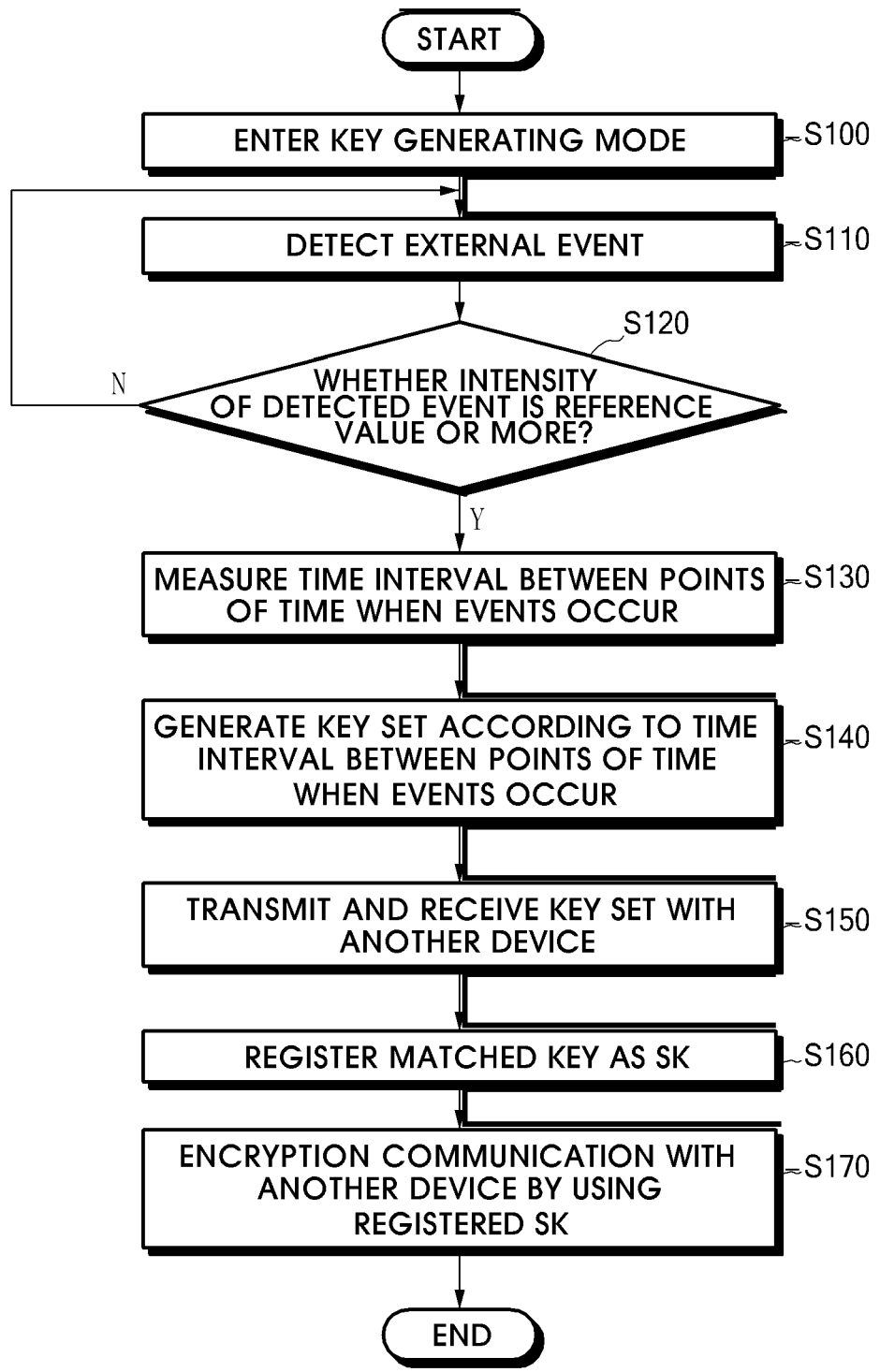
FIG. 13 is a flowchart of a method of generating a key, according to an embodiment of the present invention.

FIG. 13 is a flowchart of a method of generating a key, according to an embodiment of the present invention, and illustrates a method of generating a SK for radio-communication by the key generating system of FIG. 5. Thus, the method to be now described may be simultaneously performed in two devices that try to perform radio communication.

When the key generating system enters a key generating mode according to a user's command (Operation S100), the event detector 10 detects events (Operation S110). The user may input the same event to the two devices that try to perform radio communication. For example, the two devices may hit each other, may simultaneously hit a table, or light may be simultaneously irradiated to the two devices.

The event detector 10 determines whether an intensity of the detected event is a reference value or more (Operation S120). The event detector 10 may simply detect the events, and the key generator 40 may determine where the detected event is a valid event.

When the detected events are valid events, the key generator 40 calculates a time interval between points of time at which two or more events occur at intervals (Operation S130). The key generator 40 generates a key set based on the time interval between the points of time (Operation S140). The key set generated by the key generator 40 may be, for example, the first key set or the second key set, as described above. The controller 50 transmits and receives the key set to and from a communication target device through the wireless communication module 60 (Operation S150). In this case, the controller 50 may transmit and receive the key set to and from the communication target device according to a protocol that is previously determined by both the controller 50 and the communication target device.

The controller 50 determines whether a key from among keys of the key set matches a key contained in the communication target device. When the key of the key set matches the key contained in the communication target device, the controller 50 registers the matched key as a SK for encryption and decryption (hereinafter, referred to as the 'encryption/decryption') (operation S160). The controller 50 performs encryption-communication with the communication target device by using the registered SK (Operation S170).

In FIG. 13, Operation S130 is performed by the key generator 40. Alternatively, the time interval between points of times when events occur may be calculated by the timer 20 and the controller 50.

In Operations S150 and S170, whether the keys match each other is determined by exchanging the keys between the controller 50 and the communication target device. Alternatively, whether the keys match each other may be determined without exchanging the keys. A method of determining whether the keys match each other has been described above, and thus refer to the corresponding detailed description.

Figure 14:
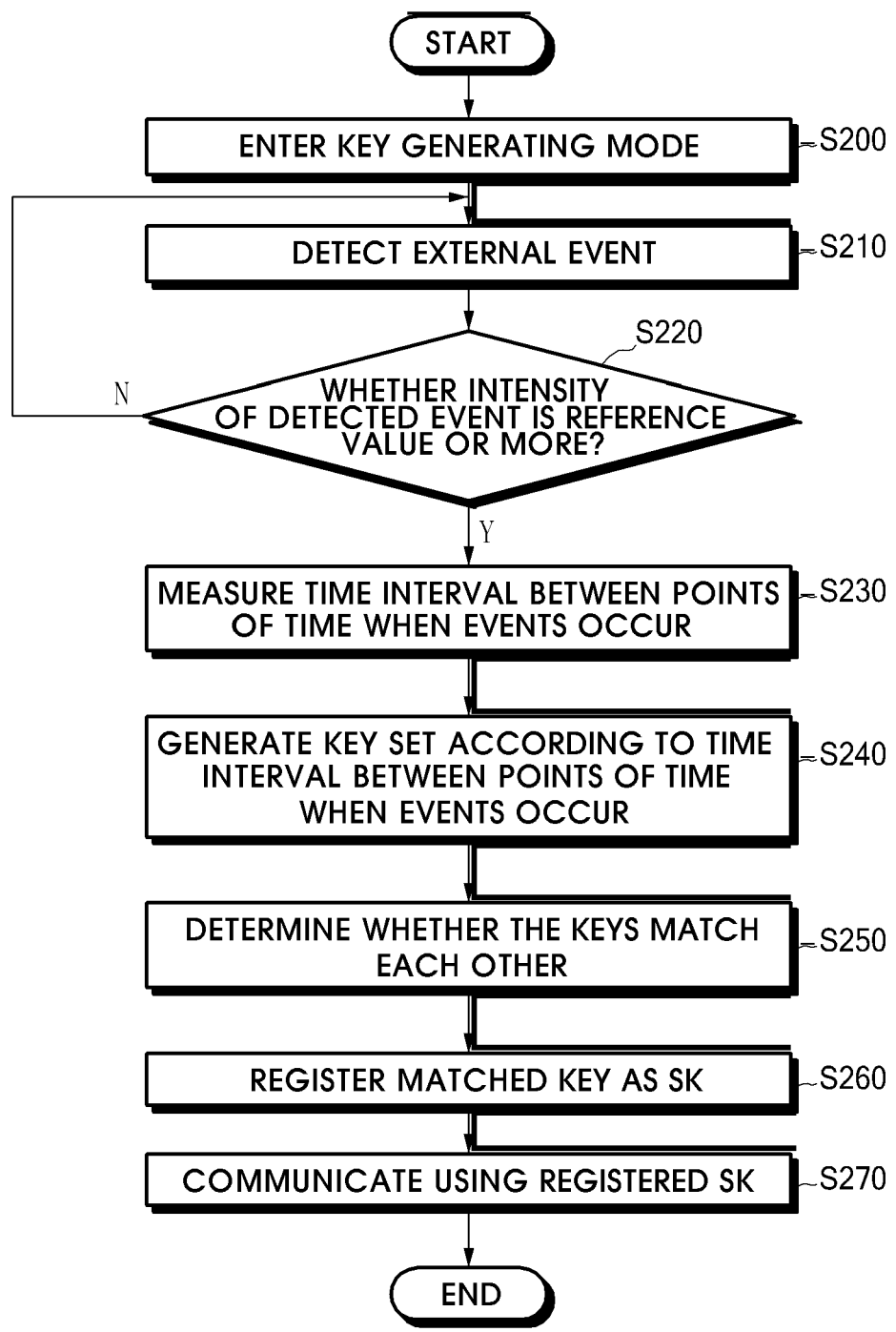
FIG. 14 is a flowchart of a method of generating a key, according to another embodiment of the present invention.

FIG. 14 is a flowchart of a method of generating a key, according to another embodiment of the present invention. FIG. 14 illustrates the method using the key generating system of FIG. 5, and the method of generating a SK for radio communication based on a detection error.

When the key generating system enters a key generating mode according to a user's command (Operation S200), the event detector 10 detects events (Operation S210). The event detector 10 determines whether an intensity of the detected event is a reference value or more (Operation S220). The event detector 10 may determined the detected event as a valid event, only when the intensity of the detected event is a reference value or more.

When the detected events are valid events, the timer 20 calculates a time interval between points of time at which two or more events occur at intervals (Operation S230). The time interval may be measured from a point of time when the event detector 10 first detects an event to points of time when the event detector 10 detects next events.

The key generator 40 generates a key set based on the time interval between the points of time (Operation S240). In this case, the key set may be the first key set or the second key set, as described above.

The controller 50 determines whether the key set (e.g., the first key set) stored in the key storage unit 30 and a key set (e.g., the second key set) contained in the communication target device match each other (Operation S250). Operation S250 may be performed i) without exchanging the first key set and the second key set between key generating systems, or alternatively, may be performed ii) by exchanging the first key set and the second key set between key generating systems, as described above (refer to FIG. 5).

When the key of the key set matches the key contained in the communication target device, the controller 50 registers the matched key as a SK for encryption/decryption (operation S260).

The controller 50 performs encryption-communication with the communication target device by using the registered SK (Operation S270). Thus, the controller 50 encrypts received data by using the key, and then transmits the data to the communication target device through the wireless communication module 60. In addition, the communication target device may decrypt and process the data transmitted through the wireless communication module 60 by using the key.

Figure 15:
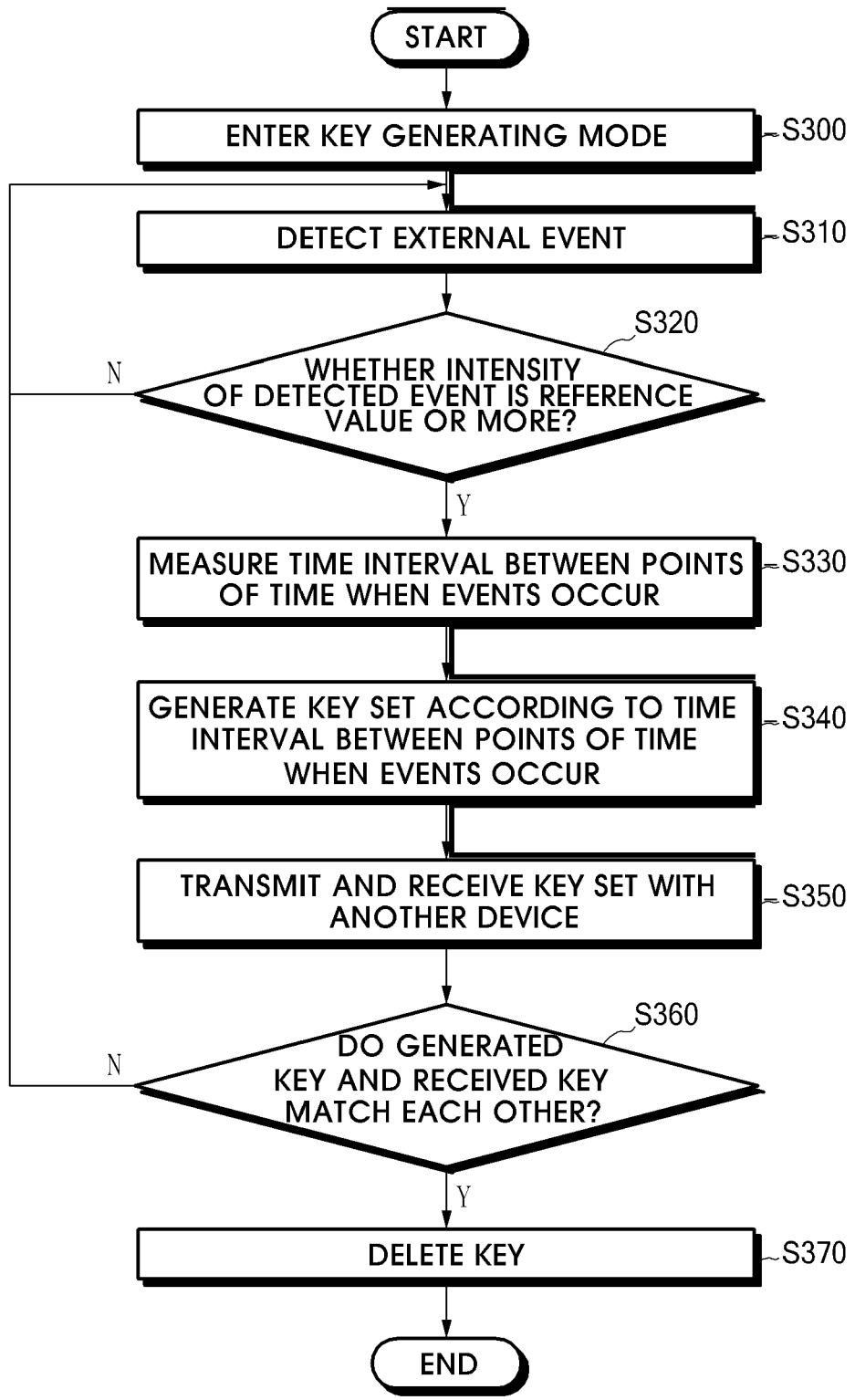
FIG. 15 is a flowchart of a method for communication security, according to an embodiment of the present invention.

FIG. 15 is a flowchart of a method for communication security, according to an embodiment of the present invention, and illustrates a case where SKs are released.

Referring to FIG. 15, since radio communication between two devices is completed, when SKs are released, the controller 50 may also control an overall operation by using an event input by a user.

When a key releasing system enters a key releasing mode according to a user's command (Operation S300), the event detector 10 detects events (Operation S310). The user may input the events such as shocks, touch, oscillation, sound, and/or light to a device where the SK is to be released, twice or more.

The event detector 10 determines whether an intensity of the detected event is a reference value or more (Operation S320).

When the detected events are valid events, a time interval between points of time at which two or more events occur at intervals is calculated (Operation S330). The time interval may be measured from a point of time when the event detector 10 first detects an event to points of time when the event detector 10 detects next events. Operation S330 may be performed by the key generator 40, the timer 20, or the controller 50.

The key generator 40 generates a key based on the time interval between the points of time (Operation S340).

The controller 50 transmits the key generated in Operation S340 to a communication target device, and receives a key from the communication target device, through the wireless communication module 60 (Operation S350).

The controller 50 compares the generated in Operation S340 with the key received from the communication target device so as to determine whether the keys match each other (Operation S360).

When the keys match each other, the controller 50 deletes the key registered as the current SK (Operation S370).

In Operation S340, whether the keys match each other may be determined by exchanging the keys. Alternatively, whether the keys match each other may be determined without exchanging the keys.

As described above, according to one or more embodiments of the present invention, a non-interactive key generating apparatus may generate keys based on events input by a user by using a small number of calculating operations. The user inputs the same event to a plurality of devices performing radio-communication so that the devices may generate the same key or hierarchical keys by using such key generating function. The keys generated by the devices may be used to perform authentication between the key generating apparatus and the communication target device, or to acquire time-synchronization between the key generating apparatus and the communication target device, and may be used for SKs for encryption communication. Likewise, since the keys are registered without interaction between wireless communication devices, the keys may be basically prevented from being exposed to a person having no right to access the keys.

In addition, data such as key pool for generating a key is not required, and keys are generated by using a small number of calculating operations, thereby saving system resources, and ensuring operational performance. Thus, a non-interactive key generating apparatus according to an embodiment of the present invention may be easily applied to an apparatus with a limited system and memory, such as a USB memory, a smart card, and a MP3 player, as well as to a cellular phone, a notebook computer, and a notebook.

As described above, according to one or more embodiments of the present invention, in a method and apparatus for generating a non-interactive key, and a method for communication security using the same, keys are generated without wireless interaction between nodes, thereby preventing the keys from being exposed. In addition, the keys may be generated using a small number of calculating operations with a simple interface, and thus a user may easily generate the keys, and the performance of an apparatus using the keys may be improved.

Accordingly, according to one or more embodiments of the present invention, in a method and apparatus for generating a non-interactive key, and a method for communication security using the same, the keys may be generated using a small number of calculating operations with a simple interface, and thus a user may easily generate the keys, and the performance of an apparatus using the keys may be improved. In addition, the keys are generated without wireless interaction between nodes, thereby improving communication security.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A key generating apparatus comprising:
    an event sensor for detecting at least one event;
    a key generator for generating a key set comprising at least a first key and a second key by using a key generating function, wherein the first key is generated by inputting a first value (V1), which is less than a time interval ($\Delta t$) between a first event and a second event detected by the event sensor, into the key generating function, and the second key is generated by inputting a second value (V2), which is more than the time interval ($\Delta t$), into the key generating function,
    a communication module which receives, from a target device, a target device key set generated by the target device according to the result of the detecting of the at least one event,
    a controller for determining whether the first key and the second key matches a key contained in the received target device key set, and in response to determining one of the first key and second key matches a key from the received target key set, registering the matched key as a security key to be used to communicate with the target device, and
    wherein each of the first value (V1) and the second value (V2) is zero or an integer number times a value "a", and the value "a" is determined based on an error limit of the key generating apparatus,
    wherein the key generator generates the first value (V1) and the second value (V2) such that the following are true:

$$V1 = \Delta t - (\Delta t \bmod a)$$

$$V2 = \Delta t - (\Delta t \bmod a) + a.$$

2. The key generating apparatus of claim 1, wherein the event sensor detects at least one of a shock, touch, oscillation, sound, and light.

3. The key generating apparatus of claim 1, wherein the key generator generates any one key from among keys having hierarchical structures.

4. The key generating apparatus of claim 3, wherein the keys having the hierarchical structures comprise a first level key, a second level key, a third level key, ..., an $(n-1)_{th}$, level key, an $n_{th}$ level key (where n is a positive integer), and
    wherein the key generator generates a key corresponding to an authority of the key generating apparatus, from among the keys.

5. The key generating apparatus of claim 4, wherein the key generator inputs the result of the detecting to a key generating function to generate the key corresponding to the authority of the key generating apparatus,
    wherein, when the first level key is generated, the result of the detecting is input to the key generating function to generate the first level key,
    wherein, when the second level key is generated, the first level key is input to the key generating function to generate the second level key,
    wherein, when the third level key is generated, the second level key is input to the key generating function to generate the third level key, and
    wherein, when the $n_{th}$ level key is generate, the $(n-1)_{th}$ level key is input to the key generating function to generate the $n_{th}$ level key.

6. The key generating apparatus of claim 1, further comprising a controller configured to try to decrypt encrypted data received from the target device by using the key generated by the key generator and configured to register the key generated by the key generator as a security key to be used to communicate with the target device when the decryption is successful.

7. The key generating apparatus of claim 6, wherein the controller tries to decrypt the encrypted data by using any one of the first key and the second key and then registers any one of the first and the second keys, with which the decryption is successful, as the security key.

8. The key generating apparatus of claim 1, further comprising: a user interface for receiving a key generating-on command or the key generating-off command,
wherein, the key generator is able to generate a key when the key generating-on command is input, and
wherein, when the key generating-off command is input, the key generator does not generate a key although an event occurs.

9. A method of generating a key, the method comprising:
detecting at least one event in a first key generating apparatus and a second key generating apparatus, respectively;
by the first key generating apparatus, generating a first key by inputting a first value (V1), which is less than a time interval ($\Delta t1$) between a first event and a second event detected by the first key generating apparatus, into a key generating function;
by the first key generating apparatus, generating a second key by inputting a second value (V2), which is more than the time interval ($\Delta t1$), into the key generating function;
by the second key generating apparatus, generating a third key by inputting a third value (V3), which is less than a time interval ($\Delta t2$) between the first event and the second event detected by the second key generating apparatus, into the key generating function;
by the second key generating apparatus, generating a fourth key by inputting a fourth value (V4), which is more than the time interval ($\Delta t2$), into the key generating function; and
by any one of the first key generating apparatus and the second key generating apparatus, determining whether any one of first key and the second key matches any one of the third key and the fourth keys,
wherein when the key generated by the first key generating apparatus matches the key generated by the second key generating apparatus, the first key generating apparatus registers the key matched with the key generated by the second key generating apparatus as a security key to be used to communicate with the second key generating apparatus, and the second key generating apparatus registers the key matched with the key generated by the first key generating apparatus as a security key to be used to communicate with the first key generating apparatus,
wherein each of the first value (V1), the second value (V2), the third value (V3), and the fourth value (V4) is zero or an integer number times a value "a", and the value "a" is determined based on an error limit of the first or the second key generating apparatus,
wherein the first key generator generates the first value (V1), the second value (V2) such that the following are true:

$V1 = \Delta t1 - (\Delta t1 \bmod a)$ $V2 = \Delta t1 - (\Delta t1 \bmod a) + a;$ the second key generator generates the third value (V3), and the fourth value (V4) such that the following are true:

$V3 = \Delta t2 - (\Delta t2 \bmod a)$ $V4 = \Delta t2 - (\Delta t2 \bmod a) + a.$ 10. The method of claim 9, wherein the first key generating apparatus encrypts data by using the first key or the second key, and transfers the encrypted data to the second key generating apparatus, and wherein the second key generating apparatus tries to decrypt the encrypted data received from the first key generating apparatus by using the third key or the fourth key, and when the decryption is successful, the second key generating apparatus registers any one of the third and the fourth keys, with which decryption is successful, as a security key to be used to communicate with the first key generating apparatus.

11. The method of claim 9, wherein any one of the generating of the first key, the generating of the second key, the generating of the third key, and the generating of the fourth key includes a step of generating any one key from among keys having hierarchical structures, according to the result of the detecting.

12. The method of claim 11, wherein the keys having the hierarchical structures comprise a first level key, a second level key, a third level key, ..., an $(n-1)_{th}$ level key, an $n_{th}$ level key (where n is a positive integer), and
any one of the generating of the first key, the generating of the second key, the generating of the third key, and the generating of the fourth key comprises a step of generating respective authority levels from among the keys.

13. The method of claim 9, wherein at least one of the first key and the second key matches any one of the third key and the fourth key.

14. The method of claim 9, wherein any one of the generating of the first key and the generating of the second key comprises a step of generating a first key set comprising a first level key and a second level key,
wherein any one of the generating of the third key and the generating of the fourth key comprises a step of generating a second key set comprising a third level key and a fourth level key, and
wherein at least one of the first level key and the second level key matches at least one of the third level key and the fourth level key.

15. The method of claim 9, wherein the event is at least one of a shock, touch, oscillation, sound, and light.

* * * * *